United States Patent
Yeh et al.

(10) Patent No.: US 12,061,351 B2
(45) Date of Patent: Aug. 13, 2024

(54) INTERACTIVE OBJECT SYSTEMS AND METHODS

(71) Applicant: Universal City Studios LLC, Universal City, CA (US)

(72) Inventors: Wei Cheng Yeh, Orlando, FL (US); Rachel E. Rodgers, Orlando, FL (US); Travis Jon Cossairt, Celebration, FL (US)

(73) Assignee: Universal City Studios LLC, Universal City, CA (US)

( * ) Notice: Subject to any disclaimer, the term of this patent is extended or adjusted under 35 U.S.C. 154(b) by 689 days.

(21) Appl. No.: 17/230,132

(22) Filed: Apr. 14, 2021

(65) Prior Publication Data

US 2021/0325580 A1  Oct. 21, 2021

Related U.S. Application Data

(60) Provisional application No. 63/010,385, filed on Apr. 15, 2020.

(51) Int. Cl.
*A63G 31/00* (2006.01)
*G02B 5/126* (2006.01)
*H02J 50/00* (2016.01)
*H04N 5/33* (2023.01)

(52) U.S. Cl.
CPC .............. *G02B 5/126* (2013.01); *A63G 31/00* (2013.01); *H02J 50/001* (2020.01); *H04N 5/33* (2013.01)

(58) Field of Classification Search
CPC ....... A63G 31/00; A63G 31/16; H02J 50/001; H04N 5/33; G02B 5/126
USPC ...................................................... 472/59–61
See application file for complete search history.

(56) References Cited

U.S. PATENT DOCUMENTS

| | | |
|---|---|---|
| 5,774,571 A | 6/1998 | Marshall |
| 8,373,659 B2 | 2/2013 | Barney et al. |
| 8,762,734 B2 | 6/2014 | Kaufman |
| 8,913,011 B2 | 12/2014 | Barney et al. |
| 9,171,454 B2 | 10/2015 | Wilson et al. |
| 2013/0249301 A1* | 9/2013 | Smoot ................... H02J 50/001 307/104 |
| 2015/0338196 A1 | 11/2015 | Cortelyou et al. |
| 2019/0220634 A1 | 7/2019 | Cossairt et al. |
| 2019/0220635 A1 | 7/2019 | Yeh et al. |
| 2019/0302991 A1 | 10/2019 | Vyas et al. |

OTHER PUBLICATIONS

PCT/US2021/027389 International Search Report and Written Opinion mailed Aug. 9, 2021.

\* cited by examiner

*Primary Examiner* — Kien T Nguyen
(74) *Attorney, Agent, or Firm* — Fletcher Yoder P.C.

(57) ABSTRACT

An interactive object system includes an interactive object and a source of electromagnetic radiation, e.g., an external source. A power harvesting device of the interactive object receives and harvests power from the electromagnetic radiation to power a special effect system of the interactive object. In an embodiment, the interactive object includes a retroreflective material that reflects electromagnetic radiation, which may be of a same or different wavelength as the electromagnetic radiation from which power is harvested. The interactive object system detects the reflected electromagnetic radiation, which may be used to trigger one or more additional actions related to the interactive object.

20 Claims, 7 Drawing Sheets

INTERACTIVE OBJECT SYSTEMS AND METHODS

CROSS-REFERENCE TO RELATED APPLICATIONS

The present disclosure claims priority to and the benefit of U.S. Provisional Application No. 63/010,385, entitled "INTERACTIVE OBJECT SYSTEMS AND METHODS" filed on Apr. 15, 2020, the disclosures of which are incorporated by reference for all purposes.

BACKGROUND

The present disclosure relates generally to the objects for use in interactive environments, such as a game environment or an amusement park. More specifically, embodiments of the present disclosure relate to a passively powered interactive object that uses power harvesting to facilitate interactive effects.

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

In recent years, it has become more common in amusement parks to create immersive environments that include props, media, and special effects that improve a guest's experience and that support a particular narrative of the environment. In certain immersive environments, it is enjoyable for the guests to have their own devices, e.g., props or toys, that interact with the environment in various ways. In one example, a guest may wish to interact with the immersive environment using a handheld device to generate a particular effect that simulates effects from the movie or game. However, handheld objects may be relatively small with limited capacity for on-board power and/or internal effects components. Further, such devices may not be capable of interacting with an immersive environment to generate these effects to create a number and/or variety of effects and independent of user input (e.g., the user turning the effect on and off). Accordingly, it is now recognized that it is desirable to have interactive objects that are capable of generating variable special effects in immersive environments.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, an interactive object system includes an infrared emitter that emits infrared light and an interactive object. The interactive object includes a housing, wherein at least a portion of an exterior surface of the housing comprises a reflector assembly that is in part transparent to the infrared light and is in part reflective of the infrared light. The interactive object also includes an optical power harvesting device configured to receive the infrared light through the reflector assembly and to harvest power from the received infrared light; and a special effect system disposed in or on the housing that receives power from the optical energy harvesting device to power one or more effects of the interactive object. The interactive object system also includes a detector that detects reflected infrared light from the reflector assembly; and a controller that controls operation of the infrared emitter and that receives data indicative of the reflected infrared light from the detector.

In accordance with another embodiment, a method includes the steps of emitting first electromagnetic radiation, using a first light source, into an area; detecting the electromagnetic radiation reflected back from a retroreflective material in the area, wherein the retroreflective material is disposed on an interactive object; determining a location of the retroreflective material based on the detected electromagnetic radiation; and emitting second electromagnetic radiation, using a second light source, towards the location to activate a special effect of the interactive object using power harvested from the second electromagnetic radiation.

In accordance with another embodiment, an interactive object is provided that includes a power harvesting device, wherein the power harvesting device harvests power from electromagnetic radiation and a housing within which the power harvesting device is disposed. The housing includes a reflector assembly that transmits the electromagnetic radiation through a first portion of the reflector assembly to the power harvesting device and that reflects the electromagnetic radiation to an external detector from a second portion of the reflector assembly, wherein the first portion comprises a transmissive material and wherein the second portion comprises a retroreflective material; and a special effect system that is powered by the harvested power from the power harvesting device. The interactive object also includes a special effect system that is powered by the harvested power from the power harvesting device.

In accordance with another embodiment, an interactive object is provided that includes a power harvesting device, wherein the power harvesting device harvests power from electromagnetic radiation and a housing within which the power harvesting device is disposed. The housing includes a reflector assembly that transmits the electromagnetic radiation of a first wavelength to the power harvesting device and that reflects the electromagnetic radiation of a second wavelength to an external detector, wherein the first wavelength and the second wavelength are different. The interactive object also includes a special effect system that is powered by the harvested power from the power harvesting device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

Guests of an immersive or themed environment may enjoy carrying a handheld object or wearing a costume element that aligns with the theme, such as a sword, stuffed animal, hat, wand, jewelry, or other prop. While these objects may have certain interactivity, typically the interactions are mediated by external devices that recognize the object (e.g., image recognition) and activate external actions based on the recognition. Such an arrangement permits the objects to be implemented as relatively inexpensive passive devices, with the more complex and costly elements of the interactions being off-board or external to the passive device. A challenge of managing interactions using such unpowered passive devices is the lack of feedback or effects that take place on or in the passive devices. While guest feedback systems can be situated as fixed components of the environment, the ability to generate feedback in or on a passive device can facilitate a deeper level of immersion in to the themed environment.

Presently disclosed embodiments are directed to special effects of a handheld or other interactive object that carries no or relatively low-power internal power supplies and that is passively powered using harvested optical or other electromagnetic energy from an external source. The power harvesting may be used to power an on-board special effect system of the interactive object or to power other feedback systems of the device. By providing external power sources, the interactive object may, in certain implementations, exclude visible power buttons or activation features as well as heavy or costly power supplies. Further, the power supply is managed by an interactive object system that can activate delivery of power to a particular interactive object (and not to other objects) within an environment and/or with timing controlled by the system (e.g., in conjunction with external effects or interactions) so that the effect experienced by the user visibly, audibly, haptically, or otherwise emanates from the user's own interactive object, which enhances the immersive experience.

The one or more on-board special effect systems are passively activated as part of an interactive object system that directs electromagnetic radiation (which may be in a nonvisible wavelength range) to the interactive object to activate its special effects or other feedback systems. In contrast to systems that harvest power from user motion, the disclosed embodiments facilitate activation of interactive object special effects independent of a user harvesting sufficient motion-based power, which permits users of a variety of abilities and interests to enjoy an immersive environment and to participate in a group narrative as directed by a control system. In addition, passive power harvesting may provide maintenance advantages, and users need not be concerned with replacing batteries before interacting with immersive environments. Still further, the interactive object system may incorporate a source of electromagnetic radiation that can be focused on a sufficiently small location such that only a desired interactive object or set of interactive objects is powered. In an embodiment, the interactive object may include a marker, such as a retroreflective marker, that is detectable within the environment and that may be used to direct the electromagnetic energy to the location of interactive object.

Such objects may, in an embodiment, be a prop or toy used within an interactive environment to permit greater variability in special effect control by using power harvesting. The use of power harvesting permits a user to move freely within an immersive environment while the interactive object receives power to activate an on-board special effect. Further, it should be appreciated that, while embodiments of the disclosure are discussed in the context of a toy, prop, or handheld object, it should be understood that the disclosed embodiments may be used with other types of objects. Such objects may include wearable objects, such as clothing, jewelry, bracelets, headgear, glasses. In addition, the object may be a prop or scenery item within an immersive environment. The immersive environment may be an environment of an amusement park, an entertainment complex, a retail establishment, etc.

Figure 1:
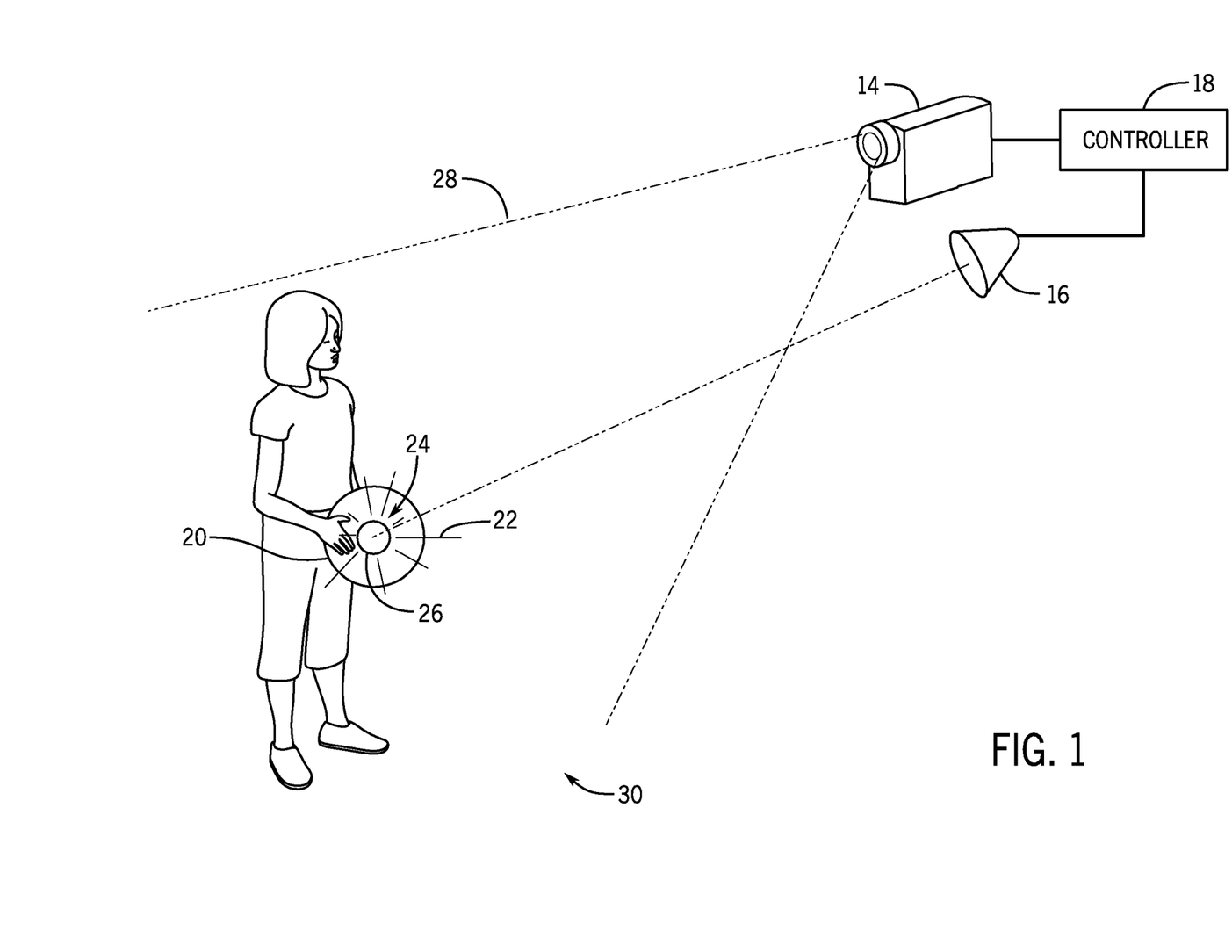
FIG. 1 is a schematic illustration of an embodiment of an interactive object system, in accordance with present techniques.

Certain aspects of the present disclosure may be better understood with reference to FIG. 1, which generally illustrates the manner in which an interactive object control system 10 may be integrated within an immersive environment in accordance with present embodiments. As illustrated, the system 10 includes one or more emitters 14

(which may be all or a part of an emission subsystem having one or more emission devices and associated control circuitry) configured to emit one or more wavelengths of electromagnetic radiation (e.g., light such as infrared, ultraviolet, visible, or radio waves and so forth). The system 10 also includes a detector 16 (which may be all or a part of a detection subsystem having one or more sensors, cameras, or the like, and associated control circuitry) configured to detect electromagnetic radiation reflected as a result of the emission, as described in further detail below. To control operations of the emitter 14 and detector 16 (emission subsystem and detection subsystem) and perform various signal processing routines resulting from the emission, reflection, and detection process, the system 10 also includes a control unit 18 communicatively coupled to the emitter 14 and detector 16.

As illustrated, the interactive object control system 10 may include an interactive object 20 (illustrated as a handheld object) that includes a housing 22 having an exterior surface 24 formed at least in part from a material that permits certain wavelengths of electromagnetic radiation, that are used to power on-board special effects, to pass through the exterior surface 24 to be received by interior power harvesting circuitry of a power harvesting device that is housed on or in the interactive object 20. In an embodiment, the interactive object may also include a retroreflective marker 26 positioned on or in the exterior surface 24. While the illustrated embodiment shows a single interactive object 20, it should be understood that the system 10 may be used in conjunction with one or more interactive objects 20 in the immersive environment.

In an embodiment, the emitter 14 is external to (e.g., spaced apart from) the interactive object 20. The emitter 14 operates to emit electromagnetic radiation, which is represented by an expanding electromagnetic radiation beam 28 for illustrative purposes, to selectively illuminate, bathe, or flood an area 30 in the electromagnetic radiation. The electromagnetic radiation beam 28, in certain embodiments, may be representative of multiple light beams (beams of electromagnetic radiation) being emitted from different sources 31 of the emitter or emitters 14 (all part of an emission subsystem that includes one or more emitters 14). For example, the source 31 may be a visible light source, an infrared light source, etc, to emit the desired wavelength of electromagnetic radiation. Further, the emitter 14 may include one or more sources 31 of different types, such as light emitting diodes, laser diodes. The electromagnetic radiation beam 28 is intended to generally represent any form of electromagnetic radiation that may be used in accordance with present embodiments, such as forms of light (e.g., infrared, visible, UV) and/or other bands of the electromagnetic spectrum (e.g., radio waves and so forth). However, it is also presently recognized that, in certain embodiments, it may be desirable to use certain bands of the electromagnetic spectrum depending on various factors. For example, in one embodiment, it may be desirable to use forms of electromagnetic radiation that are not visible to the human eye or within an audible range of human hearing, so that the electromagnetic radiation used for tracking does not distract guests from their experience. Further, it is also presently recognized that certain forms of electromagnetic radiation, such as certain wavelengths of light (e.g., infrared) may be more desirable than others, depending on the particular setting (e.g., whether the setting is "dark," or whether people are expected to cross the path of the beam).

The area 30 may correspond to all or a part of an amusement park attraction area or immersive environment, such as a stage show, a ride vehicle loading area, a waiting area outside of an entrance to a ride or show, and so forth. In an embodiment, the emitter 14 is fixed in position within the environment while the interactive object 20 moves freely within the environment to move within the area 30 and receive the electromagnetic radiation 28. Accordingly, the interactive object 20 may be detected (e.g., located within the area 30), tracked, and powered to activate one or more special effects that originate from the interactive object 20 via emitted and detected electromagnetic radiation 28 of the interactive object control system 10.

As generally disclosed herein, the activation of the special effect of the interactive object 20 is controlled by the control unit 18, which drives the emitter 14. The activation may be indiscriminate, such that the emitter 14 continuously emits electromagnetic radiation of the appropriate wavelength or frequency that corresponds to the power harvesting circuitry, and any interactive object positioned within the area 30 and oriented towards the emitter 14 is passively powered to activate the special effect. In an embodiment, as disclosed in more detail herein, the activation may be selective, such that the control unit 18 operates to locate or detect the interactive object 20 and, upon the locating or detecting, to drive the emitter 14 to direct energy of an activating wavelength towards the interactive object 20 such that the activation of the special effect at the interactive object 20 may be turned on or off depending on a desired narrative or user actions.

Figure 2:
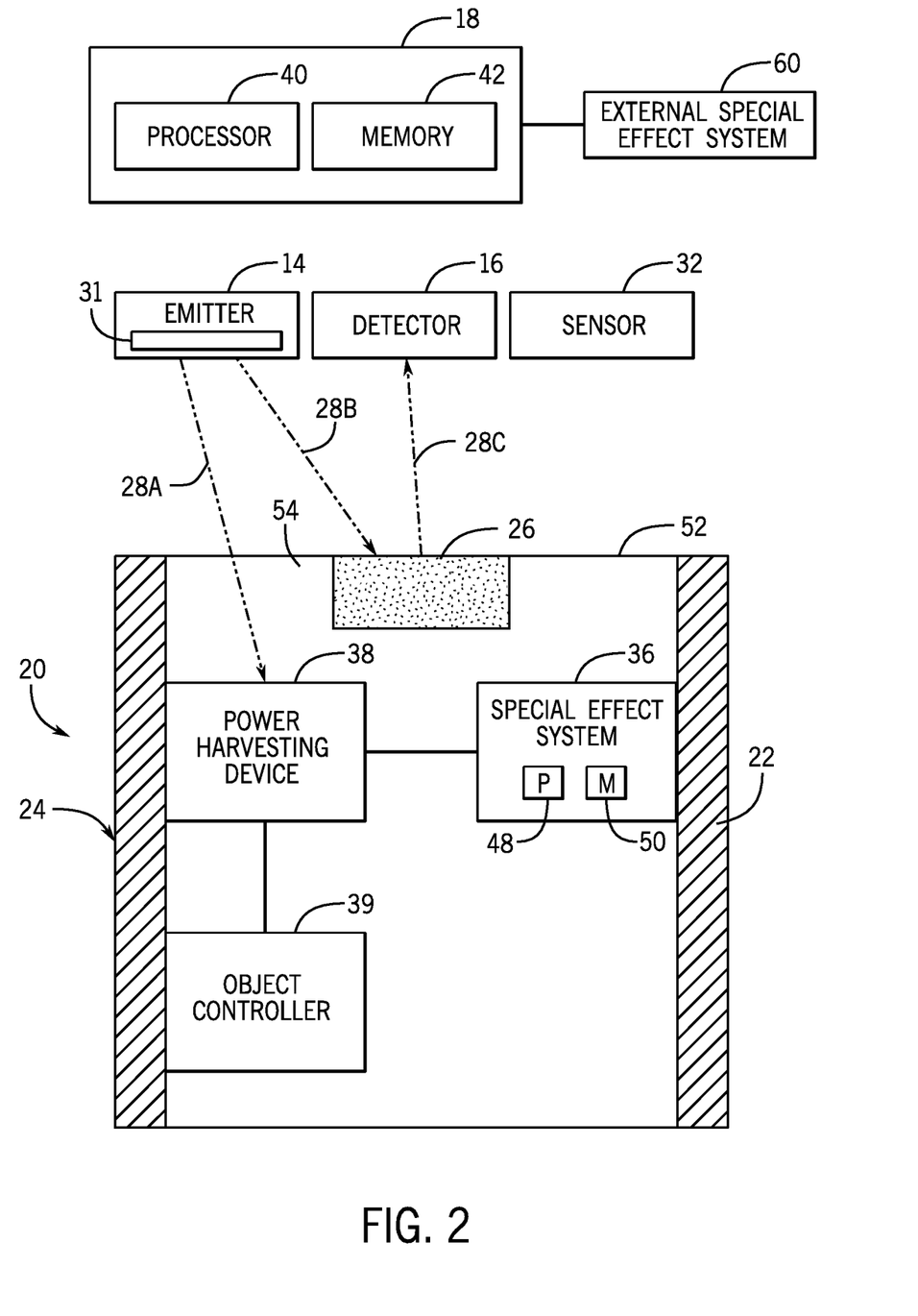
FIG. 2 is a schematic illustration of features of an embodiment of the interactive object system, in accordance with present techniques.

FIG. 2 is a schematic diagram of the system 10 showing an example of interaction between the interactive object 20 and various components of the system 10 external to the interactive object 20. In the depicted example, the interactive object 20 includes the retroreflective marker 26 that reflects electromagnetic radiation 28 of certain wavelengths that in turn is detected by the detector 16. However, it should be understood that the retroreflective marker 26 may not be present in certain implementations. Additionally or alternatively, the disclosed detection or locating of the interactive object 20 as provided herein may involve sensors 32 (e.g., proximity sensors, optical sensors, image sensors) of the system that provide location or movement data of the interactive object 20.

In operation, the electromagnetic radiation 28 (shown as electromagnetic radiation 28a) from the emitter 14 acts as a power source for the interactive object 20, which in turn uses the harvested power to activate one or more onboard special effects of a special effect system 36, which may include light, sound, fluid, haptic, or other special effects that, when activated, originated from the interactive object 20. The special effect system 36 is part of the interactive object 20 and may be contained in part within or on the housing 22 and may also include one or more features that are disposed on or visible from the exterior surface 24 to permit the user to view or experience the activated special effect. Such features may include light sources, speakers, haptic feedback devices, ports that release special effect materials (smoke, confetti, fluids), and/or actuatable elements that move in response to activation.

In the depicted embodiment, the retroreflective marker 26 operates to reflect the electromagnetic radiation 28 (shown as incident electromagnetic radiation 28b and reflected electromagnetic radiation 28c) back to the detector 16, which may be used to locate or track the interactive object 20. Because retro-reflection by the retroreflective markers 26 is such that a cone of reflected electromagnetic radiation 28 is incident on the detector 16, the control unit 18 may in turn correlate a center of the cone, where the reflected electromagnetic radiation is most intense, to a point source of the reflection. Based on this correlation, the control unit 18 may identify and track a location of this point source, or may identify and monitor a pattern of reflection by the retroreflective marker 26 over a time period as part of tracking the interactive object 20. As discussed, the emitter 14 and detector 16 operate under direction of the control unit 18. In an embodiment, the location of the interactive object 20 within the cone of the electromagnetic radiation 28 triggers activation of the emitter 14 to drive a light source that emits a beam of electromagnetic radiation that corresponds with the activating wavelength of a power harvesting device 38. In other embodiments, the wavelength or wavelengths reflected by the retroreflective marker 26 also correspond to wavelengths used for power harvesting by the power harvesting device 38. In this manner, the detection wavelength, used to located and track the interactive object 20, is also used to passively power on-board special effects of the interactive object.

The power harvesting device 38 may include an optical cell that is sensitive to certain wavelengths of electromagnetic radiation. The optical cell may include a Wi-Charge device (Wi-Charge, Milwaukee, WI) light. The power harvesting device may include a thermophotovoltaic (TPV) based power harnessing circuit. Dependent on the frequency utilized for the specific application photovoltaic (PV) based power harnessing circuits can also be utilized. In an embodiment, the activating electromagnetic radiation 28 is provided by a laser source of an emitter 14 that is capable of being focused to deliver relatively higher power. The transmission of near infrared laser light through the material 54 enables the harnessing of the laser photons into electrical power. As the laser is focused on and emits to the exact position of the material 54, significant power transmission can be achieved. The resulting power can be harnessed to perform a myriad of on-board operations of the interactive object 20, including but not limited to computation, sensing, data transceiving (e.g., under instructions from an object controller 39), and sounds, lights and motion via the special effect system 36.

In operation, the detector 16 of the system 10 may function to detect the electromagnetic radiation beam 28 retro-reflected from the retroreflective marker 26 and provide data associated with the detection to the control unit 18 for processing. The detector 16 may operate to specifically identify the marker 26 based on certain specified wavelengths of electromagnetic radiation emitted and reflected and, thus, avoid issues with false detections. For example, the detector 16 may be specifically configured to detect certain wavelengths of electromagnetic radiation (e.g., corresponding to those emitted by the emitter 14) through the use of physical electromagnetic radiation filters, signal filters, and the like. Further, the detector 16 may utilize a specific arrangement of optical detection features and electromagnetic radiation filters to capture substantially only retro-reflected electromagnetic radiation. In embodiments in which the retro-reflected wavelengths are the same as the wavelengths from which power is harvested, detection of retro-reflection may also serve as confirmation that activating wavelengths of electromagnetic radiation 28 have impinged the interactive object 20.

For example, the detector 16 may be configured to detect wavelengths of electromagnetic radiation retro-reflected by the retroreflective markers 26 while filtering wavelengths of electromagnetic radiation not retro-reflected by the markers 26, including those wavelengths of interest. To produce signals from the received electromagnetic radiation, as an example, the detector 16 may be a camera having a plurality of electromagnetic radiation capturing features (e.g., charge-coupled devices (CCDs) and/or complementary metal oxide semiconductor (CMOS) sensors corresponding to pixels). In one example embodiment, the detector 16 may be an Amp® high dynamic range (HDR) camera system available from Contrast Optical Design and Engineering, Inc. of Albuquerque, NM.

The control unit 18 that drives the emitter 14 and that receives and processes data from the detector 16 may include one or more processors 40 and one or more memory 42, which may generally referred to herein as "processing circuitry." By way of specific but non-limiting example, the one or more processors 40 may include one or more application specific integrated circuits (ASICs), one or more field programmable gate arrays (FPGAs), one or more general purpose processors, or any combination thereof. Additionally, the one or more memory 42 may include volatile memory, such as random access memory (RAM), and/or non-volatile memory, such as read-only memory (ROM), optical drives, hard disc drives, or solid-state drives. In some embodiments, the control unit 18 may form at least a portion of a control system configured to coordinate operations of various amusement park features, such as an amusement park attraction and control system. It should be understood that the subsystems of the system 10 may also include similar features. In one example, the special effect system 36 may include processing capability via a processor 48 and a memory 50. Further, the object controller 39, when present, may also include integral processing and memory components.

It should be noted that the arrangement of the one or more emitters 14, one or more detectors 16, the control unit 18, and other features may vary based on application-specific considerations and the manner in which the control unit 18 operates in conjunction with the ion. In the embodiment of the system 10, the emitter 14 and the sensor or detector 16 are integral features such that a plane of operation associated with the detector 16 is essentially overlapping with a plane of operation associated with the emitter 14. That is, the detector 16 is located in substantially the same position as the emitter 14, which may be desirable due to the retroreflectivity of the markers 26. However, the present disclosure is not necessarily limited to this configuration. For instance, as noted above, retro-reflection may be associated with a cone of reflection, where the highest intensity is in the middle of the reflected cone. Accordingly, the detector 16 may be positioned within an area where the reflected cone of the retro-reflective markers is less intense than its center, but may still be detected by the detector 16. By way of non-limiting example, in some embodiments, the emitter 14 and the detector 16 may be concentric or co-located. However, the detector 16 (e.g., an infrared camera) may be positioned in a different location with respect to the emitter 14, which may include an infrared light bulb, one or more diode emitters, a laser, or similar source.

As provided herein, the interactive object 20 permits the electromagnetic radiation 28 to transmit through a portion of the housing 22 from the exterior surface 24 and impinge appropriate circuitry of the power harvesting device 38. In an embodiment, the interactive object 20 includes a reflector assembly 52 arranged on or in the housing 22, e.g., to form part of the exterior surface 24. In an embodiment, at least a portion (e.g., a first portion) of the reflector assembly 52 is formed from a material 54 (e.g., a transmissive material) that is at least transparent to electromagnetic radiation in wavelength ranges for power harvesting. In this manner, the electromagnetic radiation 28 used to harvest power is able to penetrate through the material 54 of the housing 22 (or a reflector assembly 52 coupled to the housing 22) to reach the appropriate the power harvesting device 38. In a specific example, the power harvesting is infrared power harvesting (e.g., for near infrared light a range of 750-1200 nm), and the material 54 is transparent or mostly transparent to infrared light (e.g., permits at least 50% of infrared light to pass through). In other embodiments, the power harvesting circuitry may be disposed on or in the exterior surface 24 such that the electromagnetic radiation directly contacts the power harvesting device 38. The material 54 may be a glass or clear plastic that is transparent to visible and near infrared, such as poly(methyl methacrylate). In this manner, the material 54 may permit viewing of internal illuminated components of the special effect system 36. The material 54 may be opaque to visible light, such as a semiconductive material (e.g., silicon, germanium).

A portion (e.g., a second portion) of the reflector assembly 52 may include the retroreflective marker 26. In an embodiment, the emitter 14 is configured to emit the electromagnetic radiation beam 28 at a frequency that has a correspondence to a material of the retroreflective marker 26 (e.g., is able to be reflected by the retro-reflective elements of the marker 26). In an embodiment, the retroreflective marker 26 reflects a wavelength that is also transmitted by the transmissive material 54. In this manner, a single wavelength (or wavelength range) may be used for both power transmission and detection of the interactive object 20. In an embodiment, the wavelength (or wavelength range) used for both power transmission is different than the retro-reflected wavelength or wavelengths.

For instance, the retroreflective marker 26 may include a coating of retro-reflective material disposed on or in the exterior surface 24 or a solid piece of material coupled with the housing 22 of the object 20. By way of more specific but non-limiting example, the retroreflective material may include spherical and/or prismatic reflective elements that are incorporated into a reflective material to enable retro-reflection to occur. Again, in certain embodiments many such retroreflective markers 26 may be present, and may be arranged in a particular pattern stored in the memory 42 to enable further processing, analysis, and control routines to be performed by the control unit 18 (e.g., control system).

The retroreflective marker 26 may reflect a majority of the electromagnetic radiation (e.g., infrared, ultraviolet, visible wavelengths, or radio waves and so forth) incident from the electromagnetic radiation beam 28 back toward the detector 16 within a relatively well-defined cone having a central axis with substantially the same angle as the angle of incidence. This reflection facilitates identification of a location of the retroreflective marker 26 by the system 10 and correlation thereof to various information stored in the memory 42 (e.g., patterns, possible locations). This location information (obtained based on the reflected electromagnetic radiation) may then be utilized by the control unit 18 to perform various analysis routines and/or control routines, for example to determine whether to cause triggering or other control of an external special effect system 60. Accordingly, the system 10 may coordinate special effects activated through harvested power with external special effects mediated by the external special effect system 60. In this manner, feedback at the interactive object 20 may enhance effects within the immersive environment.

Figure 3:
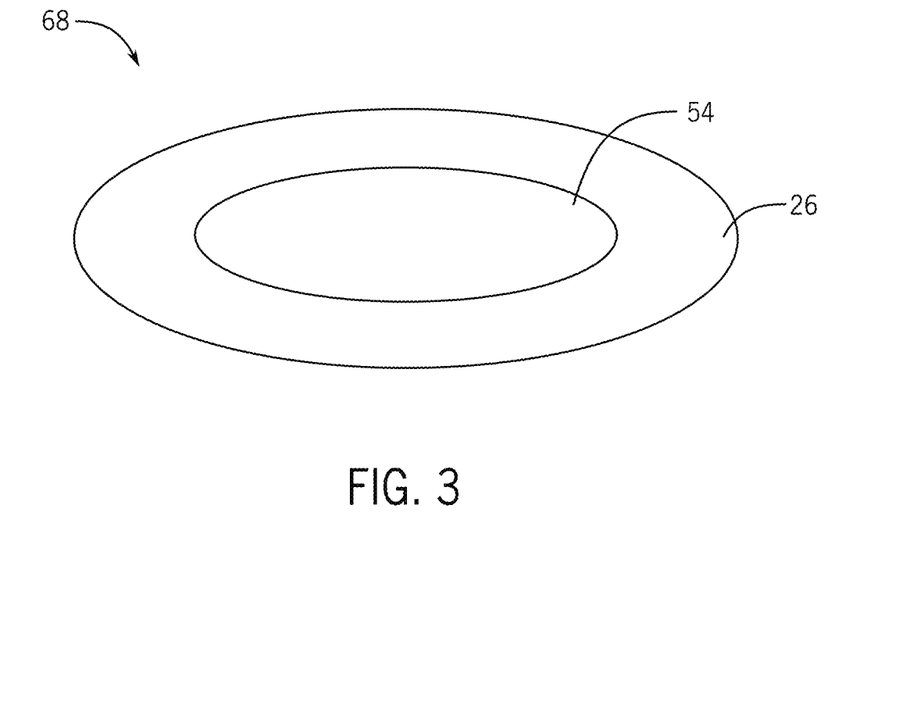
FIG. 3 is a schematic illustration of a reflector assembly, in accordance with present techniques.
Figure 4:
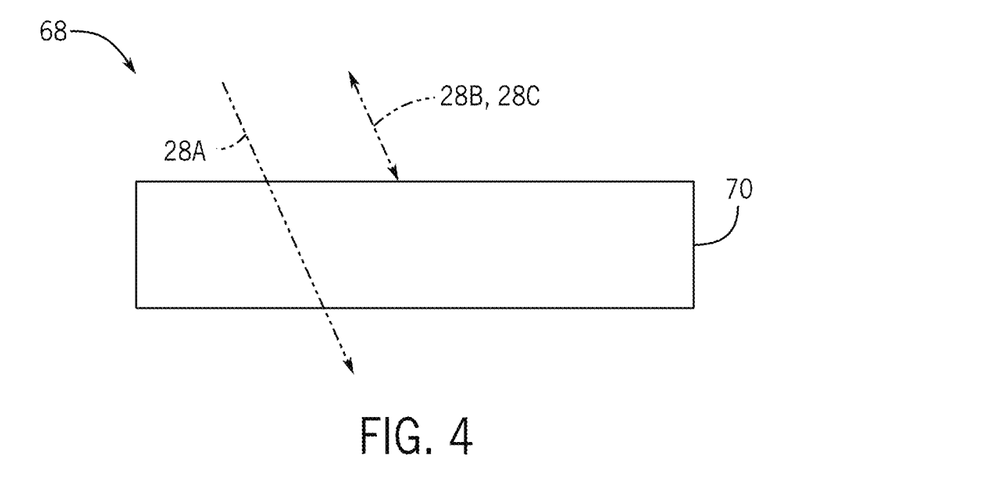
FIG. 4 is a schematic illustration of a reflector assembly, in accordance with present techniques.

FIG. 3 and FIG. 4 show examples of arrangements of the reflector assembly 52. FIG. 3 is a schematic top view of an example of the reflector assembly 52 in which the retroreflective marker 26 forms a toroid about the transmissive material 54. The material 54 at the center portion of the torus can be composed of either a transparent material, an infrared transmissive material of the same wavelength (or frequency) as the retroreflective marker 26 (~850 nm-940 nm) or transmissive of select other wavelengths (e.g. 1050 nm, 1300 nm, 1550 nm, 1720 nm). Additionally, visible light emission can be achieved by implementation of the transmissive material 54 as a transparent or translucent material layer. The transmissive material 54 and the retroreflective marker 26 may be coplanar or arranged as adjacent layers (e.g., with the transmissive material 54 adjacent to and beneath or atop the retroreflective marker 26). Further, the transmissive material 54 and the retroreflective marker 26 may be arranged such that their respective cross-sectional areas in the reflector assembly 52 are equal or unequal. In one embodiment, the transmissive material 54 and the retroreflective marker 26 form adjacent halves of the reflector assembly 52.

FIG. 4 shows a side view of a reflector assembly 52 in which a single material 70 is both retroreflective and transmissive/transparent at different wavelengths such that the reflector assembly can be transmissive of desired frequencies while reflective of others. The reflector assembly 52 may utilize a frequency specific anti reflective (AR) coating or material to enable transmissivity (shown as electromagnetic radiation beam 28a) at select wavelengths (e.g. 1550 nm) while enabling reflection (shown as electromagnetic radiation beams 28b, 28c) at other desired wavelengths (e.g. 850 nm). The arrangements in FIGS. 3-4 are shown by way of example, and it should be understood that the reflector assembly 52 can be implemented as a layer or coating and in any shape that maintains the desired level of reflectivity and according to the particular shape and geometry of the interactive object 20.

Figure 5:
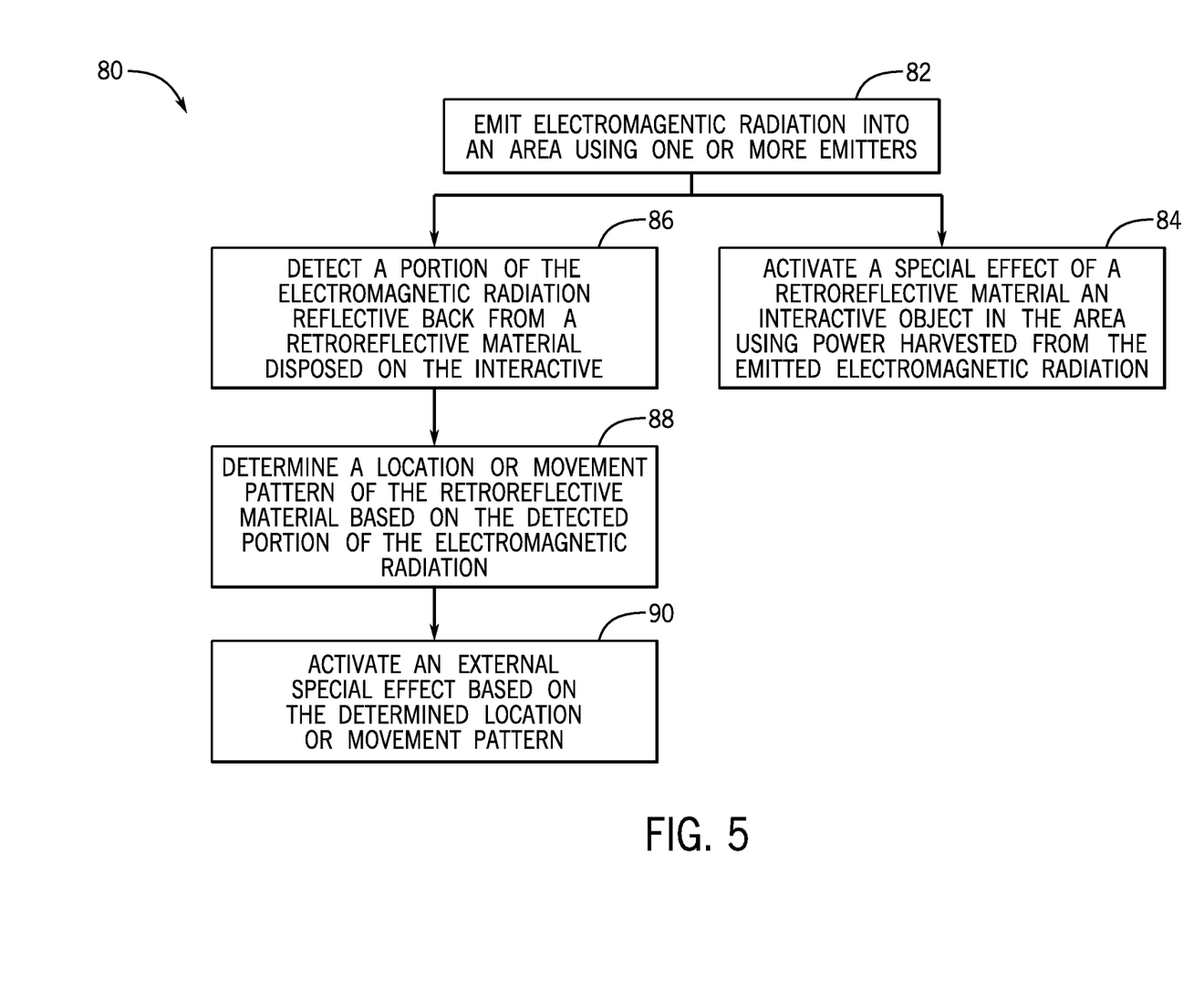
FIG. 5 is a flow diagram of a method of activating a special effect of an interactive object using the interactive object system, in accordance with present techniques.

FIG. 5 illustrates a process flow diagram of a method 80 for powering the interactive object 20. The method 80 may include steps that are stored as instructions in the memory 42 and that are executable by one or more processors 40 of the control unit 18. It should be noted that in some embodiments, steps of the method 80 may be performed in different orders than those shown, or omitted altogether. In addition, some of the blocks illustrated may be performed in combination with each other.

In the illustrated embodiment, the method 80 includes a step of emitting electromagnetic radiation into an area using one or more emitters (block 82). A portion of the emitted electromagnetic radiation is harvested by an interactive object in the area and used to activate an integral feedback of the interactive object, such as a special effect (block 84). In addition, a portion of the emitted electromagnetic radiation is also reflected by a retroreflective material of the interactive object (block 86). The location of the interactive object and/or any movement patterns of the interactive object may be detected based on a position of the reflected electromagnetic radiation received by the detector of the system (block 88). For example, in an embodiment, the controller may monitor a movement pattern of the retroreflective marker, and identify a pattern associated with a particular downstream action. Further, certain characteristics of the retroreflective marker (e.g., a number or position on the interactive object) may be used by the controller to identify the holder or type of the interactive object, and the downstream action may be selected or activated based on factors including identification information as well as the location and/or movement pattern.

For example, the downstream action may be activation of an external special effect based on the detected location and/or movement pattern of the interactive object (block 90). In one example, the interactive object is a sword, and pulling the sword from a wall activates an illumination effect in the sword in concert with associated effects in the wall, such as a pulling noise and changing in shape or color of the wall. While the wall may be a fixed component of the immersive environment capable of supporting more complex effects, the illumination effect in the sword is retained even when separated from the wall, adding to the illusion. The system 10 may operate to selectively activate integral special effects or feedback of an interactive object in conjunction with external special effects.

Figure 6:
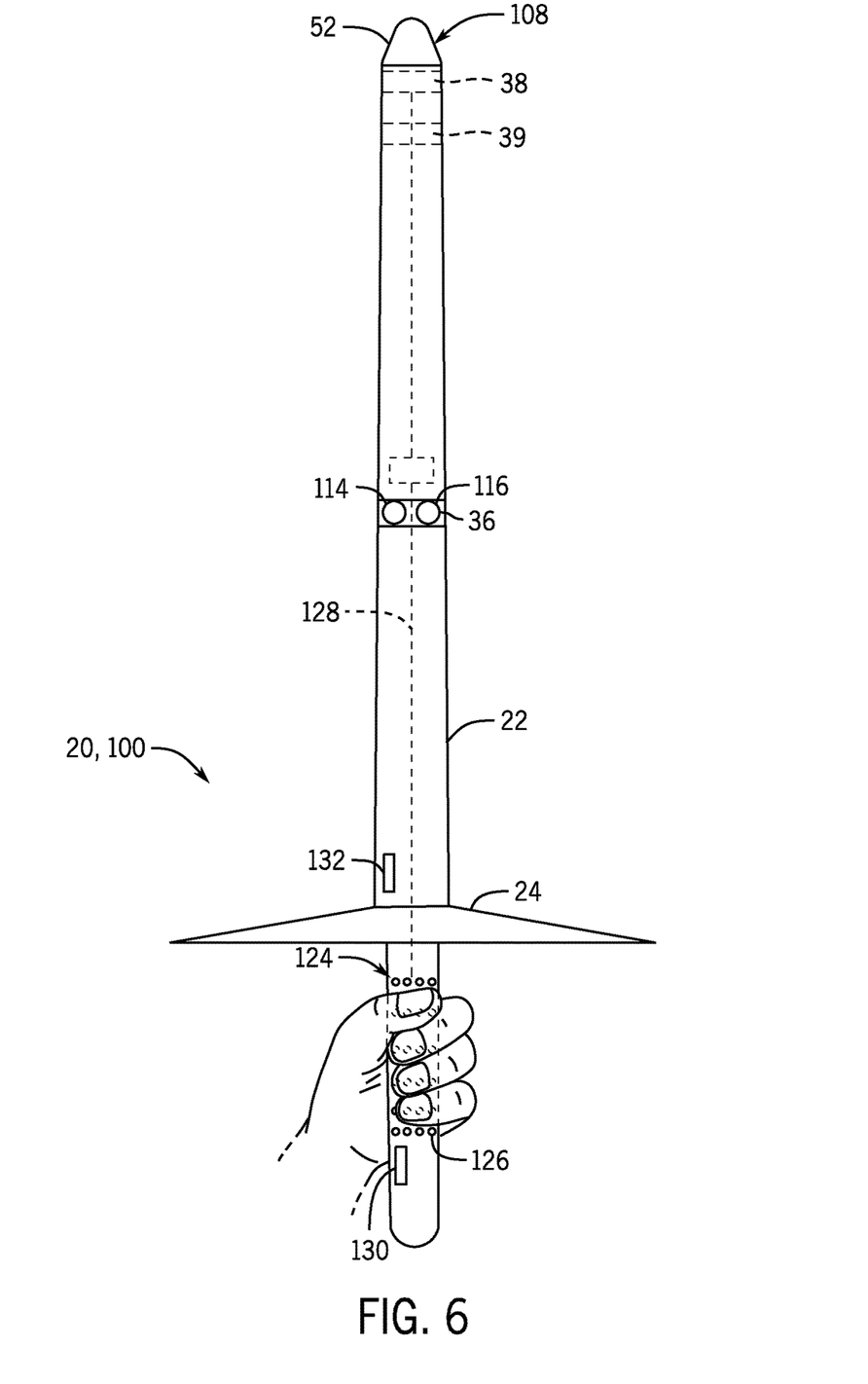
FIG. 6 is a schematic illustration of an embodiment of an interactive object that may be used in conjunction with the interactive object system, in accordance with present techniques.

In another example, illustrated in FIG. 6, the interactive object 20 may include user-specific interactive effects. The interactive object 20, illustrated here as a sword 100, is shown with a reflector assembly 52 positioned at a sword tip 108 and implemented as a point. The reflector assembly 52 permits electromagnetic radiation to penetrate through the sword tip 108 so that power can be harvested by the power harvesting device 38. In embodiments, the exterior surface 24 of the housing 22 that is not part of the reflector assembly 52 (e.g., a grip portion) is opaque to the electromagnetic radiation that passively powers the interactive object 20. In this manner, the sword 100 has an orientation, such that the sword 100 is passively powered when oriented in a particular manner towards the source of electromagnetic radiation. In other embodiments, the reflector assembly 52 may form a greater portion (or all) of the exterior surface 24. In such an embodiment, the interactive object 20 may be powered when oriented at a variety of angles relative to the emitter.

The sword 100 includes the special effect system 36 that controls on board special effects, illustrated here as multiple light sources 114, 116. The first light source 114 may be an LED light source of a first color, and the second light source may be an LED light source of a second color. The object controller 39, in an embodiment, operates to receive control signals to control operation of the special effect system 36 to selectively active the light sources 114, 116 in a particular pattern or order. In one example, the sword 100 includes an array 124 of individual pressure or grip sensors 126 that provide pressure information (via internal communication leads 128) to the object controller 39. The array may be a capacitive or force sensitive resistor array of at least 16 or at least 256 individual sensors.

The object controller 39, under passive power, can use the signals from the array 124 to calibrate based on sensor data indicative of a characteristic grip biometric for a particular user. The calibration process may activate a feedback via the special effect system 36 (e.g., activation of the light sources 114, 116 in a pattern associated with matching the sword 100 to a particular user, activating a speaker 130, activating a haptic feedback element 132). Further, the calibration information can be stored by the object controller 39. In environments in which the sword 100 receives no passive power, the sword 100 may be inert to the matched user or a nonmatched user. However, in the immersive environment, the sword 100 may receive sufficient passive power to recognize its matched user and provide a matched user special effect (e.g., green lights, clear tone) that is different than a special effect (e.g., red lights, uncomfortable sound) for a nonmatched user whose grip biometric is different than that of the matcher user. In this manner, the user may experience that his or her own particular object 20 is matched to them. Upon each use when receiving passive power, the object 20 may generate the special effects associated with the matched user when the matched user is holding the object. It should be understood that other biometric identifiers may be used. In an embodiment, the system 10 may receive facial recognition data (e.g., from the sensor 32 operating as a camera). Upon matching the facial recognition data to object recognition data (e.g., from a reflector assembly configuration or unique reflected wavelength band of the object 20), the control unit 18 may activate the emitter 14 to emit the electromagnetic radiation that powers the interactive object 20.

Figure 7:
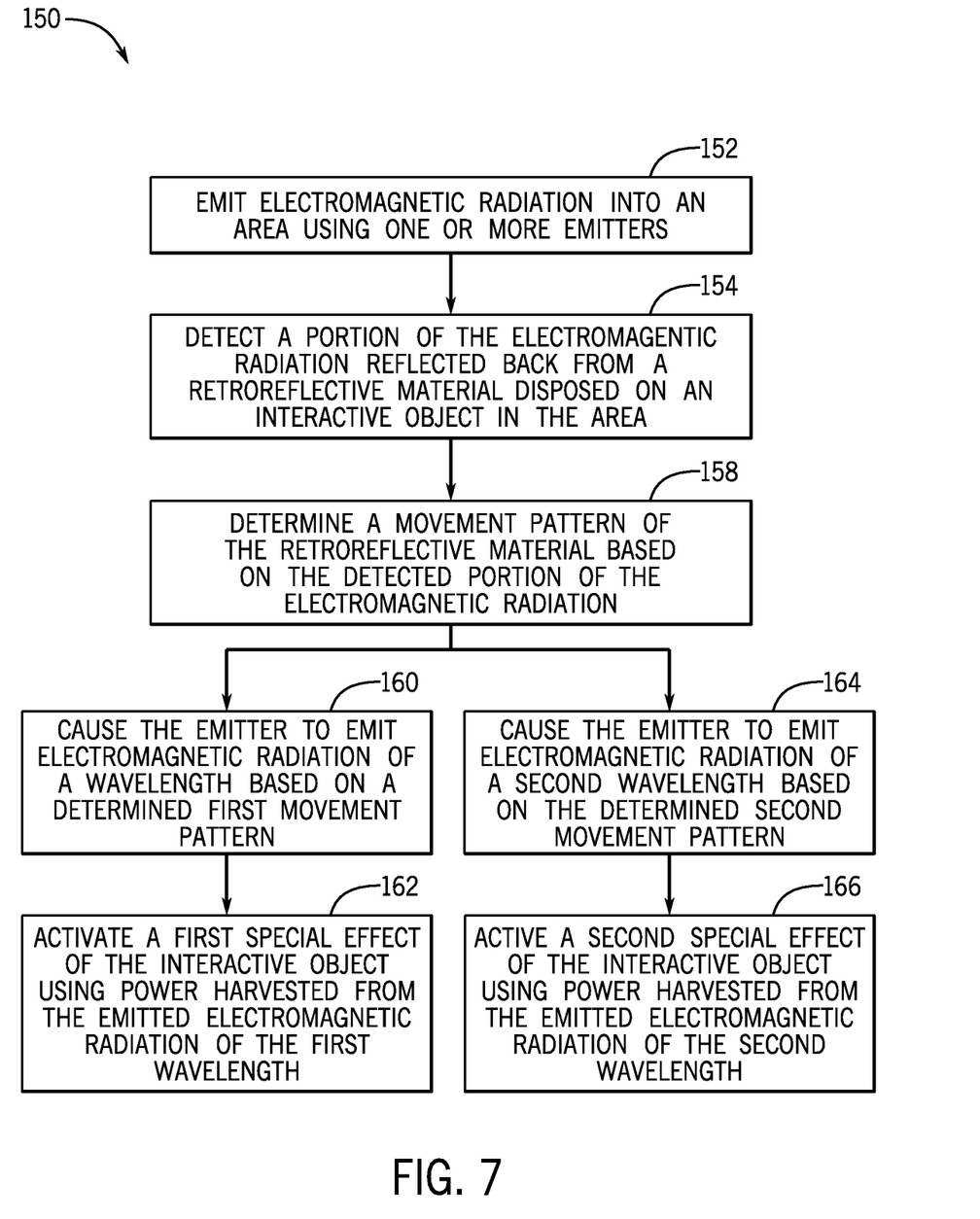
FIG. 7 is a flow diagram of a method of activating a special effect of an interactive object using the interactive object system.

FIG. 7 illustrates a process flow diagram of a method 150 for powering an interactive object with multiple available special effects. As discussed above, these effects may be selectively activated based on sensors integrated onto the interactive object. Additionally or alternatively, the special effects may be activated based on the location or movement pattern of the interactive object.

The method 150 includes a step of emitting electromagnetic radiation into an area using one or more emitters (block 152). A portion of the emitted electromagnetic radiation is reflected by a retroreflective material of the interactive object and detected (block 154). The location of the interactive object and/or any movement patterns of the interactive object may be determined based on the detected portion of the electromagnetic radiation received by the detector of the system (block 158). For example, in an embodiment, the controller may identify a first movement pattern of the retroreflective marker, and in turn drive the emitter to emit electromagnetic radiation of a first wavelength (block 160). The interactive object includes a first power harvesting device that is powered by electromagnetic radiation of the first wavelength, and passive power received by the first power harvesting device in turn causes activation of a first special effect of the interactive object that is coupled to the first power harvesting device (block 162). In another example, the controller may identify a second movement pattern of the retroreflective marker, and in turn drive the emitter to emit electromagnetic radiation of a second wavelength (block 164). The interactive object includes a second power harvesting device that is powered by electromagnetic radiation of the second wavelength, but not the first wavelength. Similarly, the first power harvesting device is not powered by electromagnetic radiation of the second wavelength. Passive power received by the second power harvesting device in turn causes activation of a second special effect of the interactive object that is coupled to the second power harvesting device (block 166). Via selective activation or tuning of a wavelength of the emitter, the external controller can influence the activated special effects on the interactive object.

Figure 8:
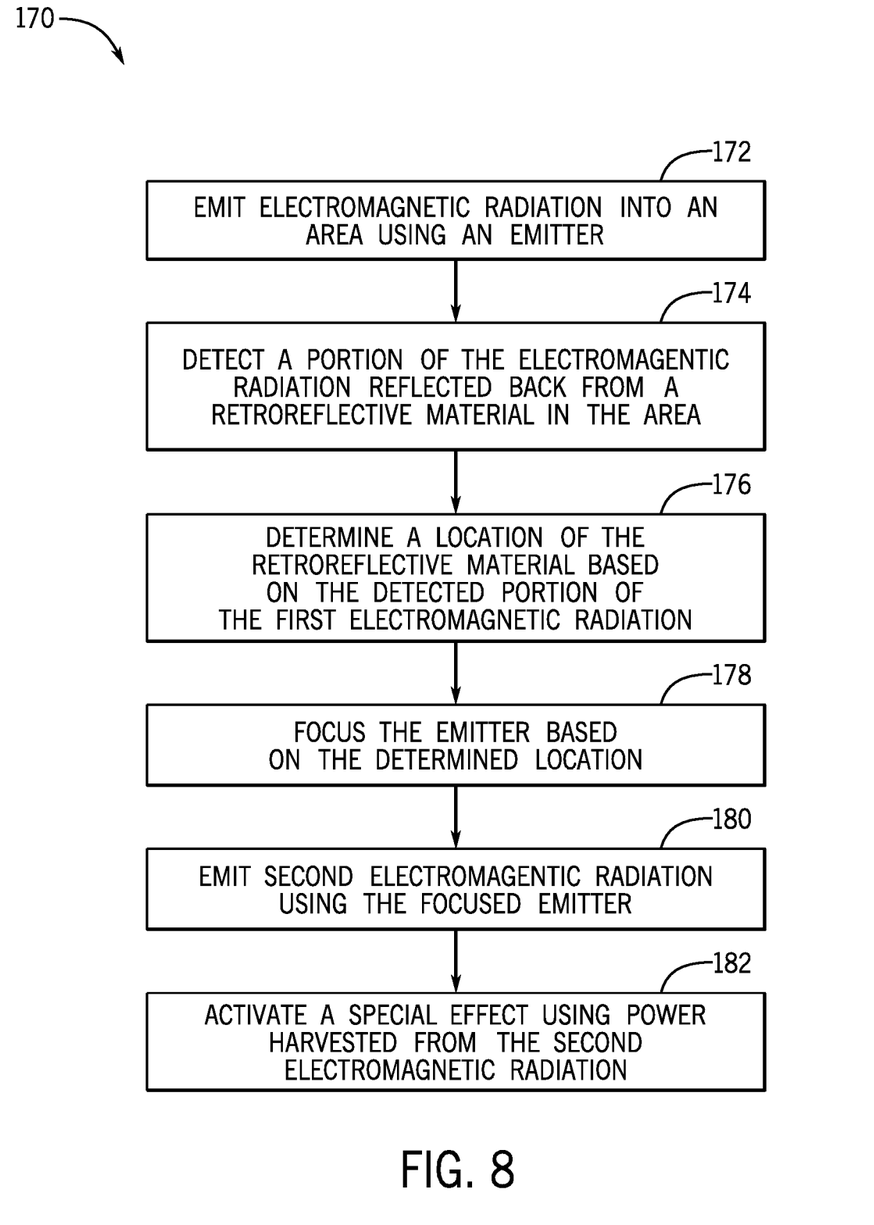
FIG. 8 is a flow diagram of a method of activating a special effect of an interactive object using the interactive object system.

FIG. 8 illustrates a process flow diagram of a method 170 for powering an interactive object that is triggered by detection of a retroreflective material on the interactive object. The method 170 includes a step of emitting electromagnetic radiation into an area using a source, e.g., a first emitter (block 172). A portion of the emitted electromagnetic radiation is reflected by a retroreflective material of the interactive object and detected (block 174). The location of the retroreflective material of the interactive object and/or any movement patterns of the interactive object may be determined based on the detected portion of the electromagnetic radiation received by the detector of the system (block 176). The emitter (using the same emission source or a different emission source) can be focused based on the detected location of the material (block 178). In an embodiment, the focusing may include estimating a location based on a known spatial relationship between the detected retroreflective material and the transmissive portion of the reflector assembly on the interactive object. The emitter emits the focused electromagnetic radiation (block 180) from which power is harvested to activate a special effect (block 182).

In one example, the focused emitter may be an emitter having one or more sources configured to emit a combination of discrete near infrared (NIR) frequencies (e.g., in a range of 800 nm-2500 nm) to achieve a plurality of functionality. The desired reflective frequency (eg. 850 nm) can be utilized to locate the position of the reflector. The reflection and tracking can be achieved through passive NIR emitters while the reflection can be followed through camera based computer vision. The position of the reflector tracked by computer vision is leveraged to actuate a NIR laser of the same or a discrete frequency from the reflective frequency. The NIR laser is additionally focused, e.g., aimed and steered to the position of the reflector or an adjusted position on the interactive object, through the use of techniques such as scanning micro mirrors or non-mechanical beam steering methods such as steerable electro-evanescent optical refractor (SEEOR). Whether a discreet NIR frequency versus the reflectance frequency is utilized ultimately is dependent on the use scenario and intended functionality of the application. Both approaches can offer similar functionality with the discrete approach adding potential additional methods of inter-device communication (eg. data, identification, response triggers). Another additional advantage of discrete frequencies is the ability for enhanced safety in the invention. For instance, while NIR reflectivity might be desired at the 850 nm range for compatibility with existing systems, a laser emitter intended to provide device power at those frequencies might not be indicated. In that instance, using a NIR laser at a discrete frequency of at least 1550 nm for instance, would enable power transmission at the intended intensity as the frequency reflects off of the eye. The use of an NIR laser permits higher passive power transmission that has enhanced ability to focus, leading to selective power transmission to one or only some interactive objects within an area while not powering others in the same area.

While only certain features of the invention have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
an infrared emitter that emits infrared light;
an interactive object comprising:
a housing, wherein at least a portion of an exterior surface of the housing comprises a reflector assembly that is in part transparent to the infrared light and is in part reflective of the infrared light;
an optical power harvesting device configured to receive the infrared light through the reflector assembly of the housing and to harvest power from the received infrared light; and
a special effect system disposed in or on the housing that receives power from the optical power harvesting device to power one or more effects of the interactive object;
a detector that detects reflected infrared light from the reflector assembly; and
a controller that controls operation of the infrared emitter and that receives data indicative of the reflected infrared light from the detector.

2. The system of claim 1, wherein the housing of the interactive object comprises a wand, and wherein the reflector assembly is disposed on a tip of the wand.

3. The system of claim 1, wherein the infrared emitter comprises a first infrared light source that emits the infrared light in a first wavelength range and a second infrared light source that emits additional infrared light in a second wavelength range.

4. The system of claim 3, wherein the second infrared light source is a near infrared laser.

5. The system of claim 3, wherein the infrared light is in a range of 800 nm-1550 nm.

6. The system of claim 3, wherein the first wavelength range and the second wavelength range are different.

7. The system of claim 3, wherein the controller is programmed to activate the second infrared light source based on the data indicative of the reflected infrared light from the detector.

8. The system of claim 7, wherein the first infrared light source is continuously active.

9. The system of claim 1, wherein the reflected infrared light is in a same wavelength range as the received infrared light from which the optical power harvesting device harvests power.

10. The system of claim 9, wherein the reflected infrared light is in a range of about 850 nm to about 940 nm and the received infrared light at the optical power harvesting device is at least 1000 nm.

11. The system of claim 1, wherein the special effect system comprises a haptic feedback device, wherein the haptic feedback device is configured to be activated in response to the optical power harvesting device harvesting power from the received infrared light.

12. The system of claim 1, wherein the special effect system comprises a light source configured to be activated to shine light from the housing in response to the optical power harvesting device harvesting power from the received infrared light.

13. The system of claim 1, wherein the special effects system comprises:
a plurality of sensors disposed on the exterior surface of the interactive object in a region corresponding to a grip portion; and
an object controller disposed on or in the housing that is programmed to:
receive signals from the plurality of sensors;
identify a grip of a user holding the interactive object based on the signals; and
generate a control signal to the special effect system based on the identified grip.

14. The system of claim 13, wherein the special effects system further comprises a haptic feedback device, a light source, or both, that are activated in response to the generated control signal.

15. The system of claim 1, wherein the reflector assembly comprises a material that is transparent to the infrared light and at least partially opaque to visible light.

16. A method, comprising:
emitting first electromagnetic radiation, using a first light source, into an area;
detecting the electromagnetic radiation reflected back from a retroreflective material in the area, wherein the retroreflective material is disposed on an interactive object;
determining a location of the retroreflective material based on the detected electromagnetic radiation; and
emitting second electromagnetic radiation, using the first light source or a second light source, towards the location to activate a special effect of the interactive object using power harvested from the second electromagnetic radiation.

17. The method of claim 16, wherein the first light source is an infrared light source and the second light source is an infrared laser light source.

18. The method of claim 16, comprising focusing the second light source to emit the second electromagnetic radiation based on the location.

19. The method of claim 18, wherein focusing the second light source comprises focusing on a portion of the interactive object based on a known relationship between the location of the retroreflective material and a position of a material on the interactive object through which the second electromagnetic radiation penetrates to reach a power harvesting device to activate the special effect of the interactive object.

20. An interactive object, comprising:
a power harvesting device, wherein the power harvesting device harvests power from electromagnetic radiation;
a housing within which the power harvesting device is disposed, the housing comprising: a reflector assembly that transmits the electromagnetic radiation through a first portion of the reflector assembly to the power harvesting device and that reflects the electromagnetic radiation to an external detector from a second portion of the reflector assembly, wherein the first portion comprises a transmissive material and wherein the second portion comprises a retroreflective material; and
a special effect system that is powered by the harvested power from the power harvesting device.

* * * * *